United States Patent [19]

Post

[11] Patent Number: 5,156,712
[45] Date of Patent: Oct. 20, 1992

[54] SEALING SYSTEM

[76] Inventor: Ronald Post, 50 E. High St., New Freedom, Pa. 17349

[21] Appl. No.: 482,908

[22] Filed: Feb. 22, 1990

[51] Int. Cl.$^5$ .................. B27G 11/02; B32B 31/00
[52] U.S. Cl. .................. 156/380.4; 156/581; 156/273.1
[58] Field of Search ............... 156/272.2, 273.1, 379.6, 156/380.2, 380.4, 380.6, 380.5, 285, 272.6, 581, 583.1, 583.2, 583.3, 273.4, 515, 251

[56] References Cited

U.S. PATENT DOCUMENTS

| | | | |
|---|---|---|---|
| 3,067,119 | 12/1962 | Ramaika | 156/272.6 X |
| 3,196,063 | 7/1965 | Paquin et al. | 156/244.17 X |
| 3,791,908 | 2/1974 | Gidge | 156/380.6 X |
| 3,959,567 | 5/1976 | Bradley | 156/379.6 X |
| 3,997,385 | 12/1976 | Osborne | 156/285 |
| 4,096,013 | 6/1978 | Lutzmann et al. | 156/272.6 |
| 4,397,702 | 8/1983 | Klein et al. | 156/273.1 X |
| 4,419,855 | 12/1983 | Shanklin | 156/273.1 |
| 4,490,199 | 12/1984 | Dunning | 156/73.4 |
| 4,534,818 | 8/1985 | Kreager | 156/581 X |
| 4,707,208 | 11/1987 | Crumbach et al. | 156/285 |
| 4,717,516 | 1/1988 | Isaka et al. | 156/285 X |
| 4,854,999 | 8/1989 | Schirmer | 156/272.6 |

Primary Examiner—David A. Simmons
Assistant Examiner—Chester T. Barry
Attorney, Agent, or Firm—Daniel J. O'Connor

[57] ABSTRACT

A film sealing system and method which utilizes the combined application of pressure and high voltage static charge to achieve a high quality seal between two plastic layers of packaging material.

Pressure is applied via a sealing bar 40 to evacuate air from between two film layers to be sealed together. A static charge is then applied via a static probe 30.

Relatively high pressure air is admitted to a passage which surrounds the static probe. Such air induction of the static charge has been found to intensify the static charge penetration of the film layers and to consequently produce a higher quality film seal.

1 Claim, 1 Drawing Sheet

SEALING SYSTEM

BACKGROUND AND OBJECTS OF THE INVENTION

This invention relates generally to the longitudinal sealing of low density polyethylene films having utility in the product packaging arts.

The longitudinal seal as used in the art is an overlapping seal of a width generally from ⅜ inch to 1¼ inches. Such is in contrast to the cross seal used in packaging which generally is quite narrow and which is achieved by the known thermal hot knife process.

It has been known in the arts to achieve a longitudinal seal by various pressure and/or heat sealing methods of the prior art.

The use of a static charge in combination with pressure and/or thermal sealing means has recently been introduced by the inventor of the present application. Such usage has proven to be novel and highly useful. Recent experimentation, however, has been successfully performed which significantly improves the quality and consistency of longitudinal seals. Such is the subject matter of the present specification.

Accordingly, it is an object of the present invention to demonstrate a longitudinal sealing system which results in a higher quality seal of enhanced durability and appearance.

It is a further object of the invention to demonstrate a longitudinal sealing system which is of improved consistency from seal to seal and over long production time periods.

It is a still further object to illustrate a longitudinal sealing apparatus which may be economically constructed and used in the product sealing arts.

It is also a highly important object of the invention to demonstrate a novel method of inducing a static charge as a part of a film sealing process.

These and other objects and advantages of the invention will be apparent to those of skill in the art from the description which follows.

BRIEF SUMMARY OF THE INVENTION

The present invention utilizes a static charge intensifier channel to admit relatively high pressure air around a high voltage static probe 30.

The air thus admitted to the system intensifies the static charge and serves to create a higher quality seal between film layers than has heretofore been known in the arts.

The additional use of pressure, via a pressure bar 40, and temperature, via heating of the pressure bar or other system components, also results in the desired high quality longitudinal seal.

In practice of the invention, a sealing bar movable from a lower to an upper position is utilized.

An essentially fixed mounting block is further used and contains a first aperture or channel 21 for containment of the static probe. The mounting block further incorporates a second aperture or line 22 to admit air into the region of the static charge and produce a higher quality plastic seal.

Static charge is received by a static plate and conducted to a ground point.

The movable sealing bar may be heated if desired to further enhance the sealing effect.

PRIOR ART PATENTS

The four prior art U.S. patents believed to be most relevant are incorporated by reference into this specification, namely:

1. U.S. Pat. No. 3,329,549 (Vilutis)
2. U.S. Pat. No. 3,725,189 (Gidge)
3. U.S. Pat. No. 3,742,180 (Bradley)
4. U.S. Pat. No. 4,372,798 (Dalton)

The above-cited patents illustrate generally the state of the art with reference to static charge film laminating.

As will be appreciated, the prior art does not teach or show the use of an air-induced static charge system. It is also apparent that the particular combination of elements set forth in the present specification has not been shown or described in the prior art patented systems.

A search of the literature in the film sealing arts has also produced no system comparable to the combination of elements set forth herein.

BRIEF DESCRIPTION OF THE DRAWING FIGURES

FULL DESCRIPTION OF THE PREFERRED EMBODIMENT

Figure 1:
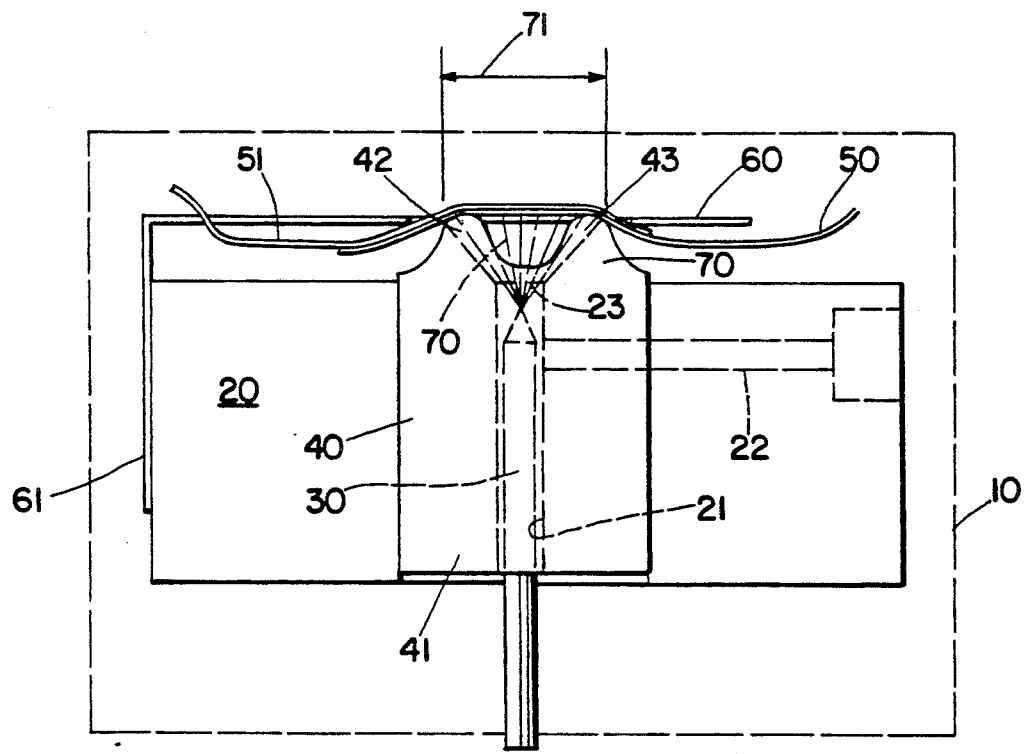
FIG. 1 shows a side elevation view of the main components of the present invention. In the view shown, the sealing bar is in the up (i.e. laminating) position.
Figure 2:
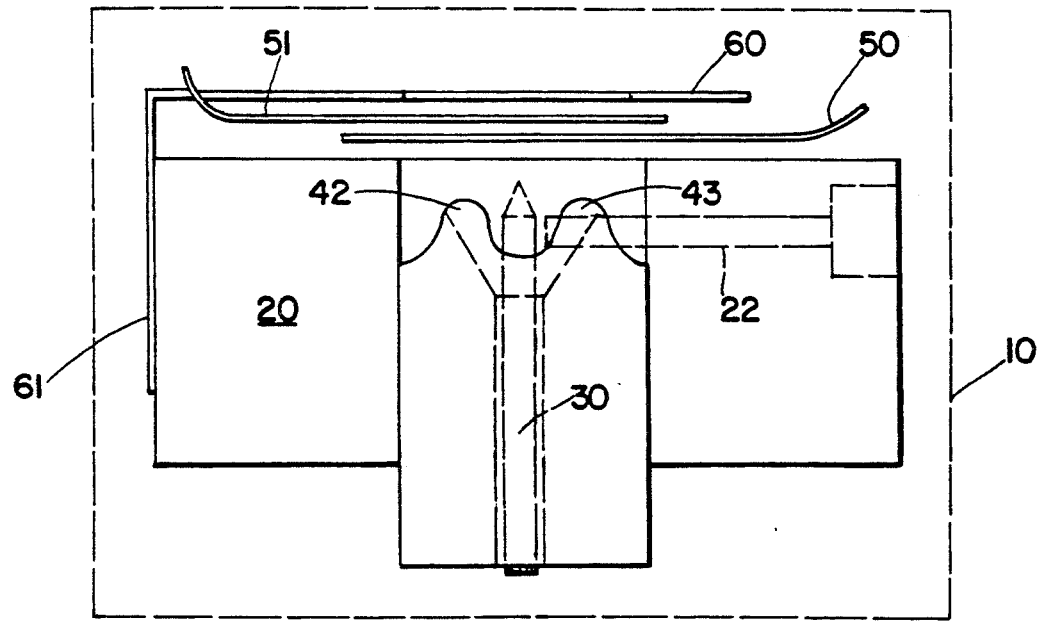
FIG. 2 shows a side elevational view of the system similar to FIG. 1 except that the sealing bar is shown in the lower position.

Referring now to the drawing FIGS. 1 and 2, the area shown within dotted line 10 shows the principal components of the invention. Conventional film drive and supply elements known in the art are eliminated for clarity of description.

FIG. 2 illustrates the two distinct film layers 50 and 51 to be sealed together along a longitudinal line. FIG. 2 also shows the sealing bar 40 in its lowered position.

FIG. 1 illustrates the system with the sealing bar 40 in its raised position, i.e. pressing the two film layers 50 and 51 into sealing engagement with each other.

In practice of the invention, a sealing bar 40 is raised by conventional means at its lower end 41 such that its upper ends 42 and 43 contact film layers 50 and 51 to be laminated. Unwanted air between the film layers is thus eliminated by means of the upper pressure plate 60. The sealing bar raised position is shown in FIG. 1.

Once air is evacuated from between film layers 50 and 51, a high voltage (20–24,000 V.) static probe 30 is activated causing a static charge to be passed through the film layers 50 and 51 to the static plate 60. The static plate is typically made of stainless steel and is connected to a suitable ground point as indicated at numeral 61.

The mounting block 20 may typically contain a channel 21 for containment of the static probe 30. See FIG. 1. Thus, when the static probe is activated, a charge flows through orifice 23 to achieve static sealing of the film layers 50 and 51.

It is noted that the sealing bar 40 may also be heated to accomplish a thermal sealing of the film layers 50 and 51.

In an important advance of the present invention, an air line 22 may also be included which is connected to channel 21 for introducing relatively high pressure air around the static probe 30. Since the high pressure air must also flow out of orifice 23, it has the effect of intensifying and further inducing the static charge penetration of the film layers 50 and 51.

The static charge and air flow is thus passed onto the film layers 50 and 51 as illustrated by dotted lines 70 to create a seal of width 71 as shown.

It is noted that the high pressure air from line 22 will also have a secondary effect of further removing undesired air pockets from between the film layers 50 and 51.

The above-described system has been experimentally found to yield a high quality and high consistency longitudinal seal in the polyethylene film arts. The resulting longitudinal seal is clearly superior to those previously achieved in the static probe sealing arts by reason of the high pressure air supplied via line 22.

Various modifications of the above invention may be made and still fall within the spirit and scope of the present invention. For example, the film layers 50 and 51 may comprise any known plastics or other materials capable of being laminated via a static probe. Further, the pressure bar 40 may be applied simultaneously with the static probe activation. It is also contemplated that heat may be applied as needed to create an additional thermal sealing effect it such is deemed desirable for use in the system. These and other modifications will be apparent to those of skill in the laminating arts.

One important aspect of the present invention is the use of air to enhance the static charge sealing process.

I claim:

1. A system which seals two film layers together along a longitudinal line for packaging products comprising:

a sealing bar which may be moved from a lower position to an upper position for applying pressure to said film layers, a fixed mounting block, said mounting block having a channel for containment of a static probe, said static probe being fixed in its operating location and said static probe being of sufficiently high voltage to cause a static charge to pass through said two film layers, wherein said sealing bar is capable of movement independently of said static probe and said mounting block, an air passageway means for admission of air into said mounting block, said air passageway means being formed within said mounting block, said air passageway means being connected to said channel to provide means wherein a static charge applied to said film layers is intensified to produce a more durable seal between said layers, wherein said static probe can be removed from said mounting block without affecting or moving said air passageway means, wherein said sealing bar has a first upper end means and a second upper end means to evacuate air from between said film layers, said system including an orifice means for admission of static charge to a film sealing area, wherein said orifice means is connected to said static probe containing channel, wherein said orifice means is smaller than said static probe containing channel, wherein said air passageway means is connected in perpendicular to said static probe containing channel, said system further including a pressure static plate for receipt of the static charge and conduction to a ground point, wherein said sealing bar presses said film layers together on said grounded pressure static plate.

* * * * *